United States Patent [19]
Nagafuchi

[11] Patent Number: 4,578,298
[45] Date of Patent: Mar. 25, 1986

[54] COMPOSITE FILMS FOR PROTECTING DOCUMENTS FROM BEING REPRODUCED

[75] Inventor: Kazumasa Nagafuchi, Hyogo, Japan

[73] Assignee: Kisokaseisangyou Co., Ltd., Osaka, Japan

[21] Appl. No.: 633,131

[22] Filed: Jul. 20, 1984

[30] Foreign Application Priority Data

Jul. 25, 1983 [JP] Japan .............................. 58-116014[U]
Oct. 3, 1983 [JP] Japan .............................. 58-154207[U]
Dec. 10, 1983 [JP] Japan .............................. 58-190758[U]

[51] Int. Cl.⁴ .............................................. B32B 7/06
[52] U.S. Cl. ...................................... 428/40; 428/344; 428/354; 283/902

[58] Field of Search .................. 283/902; 428/40, 344, 428/354

[56] References Cited

U.S. PATENT DOCUMENTS 4,118,122 10/1978 Rees et al. ........................ 283/902 X
4,303,307 12/1981 Tureck et al. .................... 283/902 X
4,312,688 1/1982 Brodis et al. ...................... 428/40 X Primary Examiner—Alexander S. Thomas
Attorney, Agent, or Firm—Harding, Earley, Follmer & Frailey

[57] ABSTRACT

A composite film for protecting documents from being reproduced comprising a colored transparent film and a transparent adhesive layer applied to the back of the transparent film.

2 Claims, 4 Drawing Figures

COMPOSITE FILMS FOR PROTECTING DOCUMENTS FROM BEING REPRODUCED

This invention relates to composite films for protecting documents, on which information has been recored, from being reproduced by means of photography or electronic photography.

Conventionally, documents, for example, papers or films on which information such as letters and figures have been recorded by handwriting, printing or copying, were reproduced frequently by means of electronic duplicating machines or cameras without asking their possessor's permission.

An object of the invention is to provide composite films for protecting documents from being reproduced, said composite films being so adapted that when they are affixed to the surface of documents on which information has been recorded, of the the information can be seen through them, but the information can't be reproduced because reproductions made by means of electronic duplicating machines or cameras become black and are not legible.

A further object of the invention is to provide composite films protected from being reproduced by themselves, said composite films being so adapted that when informations are recorded on the surface of them, the informations are visible, but the informations can't be reproduced because reproductions made by means of electronic duplicating machines or cameras become black and are not visible.

Other objects of the invention will become apparent from the description given below and the accompanying drawings.

According to the invention, there are provided a composite film for protecting documents from being reproduced comprising an orange, brown or red colored transparent film and an adhesive layer applied onto the surface of the transparent film; a composite film for protecting documents from being reproduced comprising an orange, brown or red colored transparent film, a metallic foil capable of being seen through formed by vacuum deposition on the back of the transparent film and a transparent adhesive layer applied onto the surface of the metallic foil; a composite film protected from being reproduced comprising an orange, brown or red colored transparent film and a transparent resin film containing fine articles of a matting agent, said resin film being applied onto the surface of the transparent film; and a composite film protected from being reproduced comprising an orange, brown or red colored transparent film, a transparent resin film containing fine articles of a matting agent, said resin film being applied onto the surface of the transparent film and a metallic foilcapable of being seen through formed by vacuum deposition on the back of the transparent film.

The invention will be described in detail according to embodiments with reference to the accompanying drawings.

Figure 1:
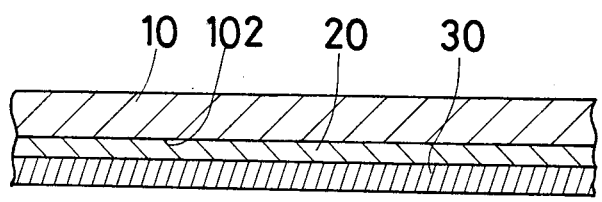
FIG. 1 is an enlarged fragmentary sectional view of a composite film for protecting documents from being reproduced according to the first aspect of the invention.

The composite film for protecting documents from being reproduced according to the first aspect of the invention, as shown in FIG. 1, comprises an orange, brown or red colored transparent film 10 and a transparent adhesive layer 20 applied onto the back 102 of the transparent film 10. The adhesive layer is applied to the back 102 of the transparent film 10 preferably in the following manner. An adhesive layer is applied to a releasing paper or film, and then the adhesive layer is adhered to the back 102 of the transparent film 10. Subsequently, the paper or film is separated from the adhesive layer. Furthermore it is preferable to use with the adhesive layer 20 a releasing paper 30, to the surface of which a releasing agent, for example silicon resin, has been applied.

Figure 2:
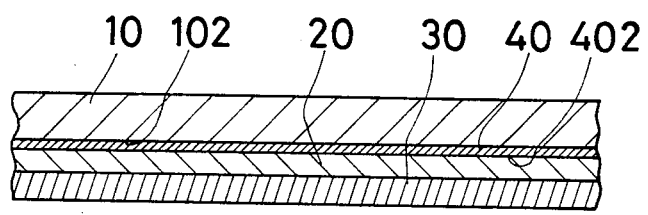
FIG. 2 is an enlarged fragmentary sectional view of a composite film for protecting documents from being reproduced according to the second aspect of the invention.

The composite film for protecting documents from being reproduced according to the second aspect of the invention, as shown in FIG. 2, comprises an orange, brown or red colored transparent film 10, a metallic foil 40 capable of being seen through formed by vacuum deposition on the back 102 of the transparent film 10 and a transparent adhesive layer 20 applied to the surface 402 of the metallic foil 40. The metallic foil 40 is formed by vapourizing a metal, for example, aluminum or silver in vacuum and depositing the metal on the back 102 of the transparent film 10, and has 10–70% of the transmittance of visible rays. It is preferable to affix removably the foregoing releasing paper 30 to the surface of the adhesive layer 20.

Figure 3:
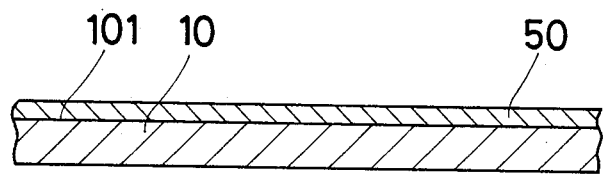
FIG. 3 is an enlarged fragmentary sectional view of a composite film protected from being reproduced according to the third aspect of the invention.

The composite film protected from being reproduced according to the third aspect of the invention, as shown in FIG. 3, comprises an orange, brown or red colored transparent film 10 and a transparent resin film 50 containing fine articles of a matting agent, said resin film being applied to the surface 101 of the transparent film 10. As explained in detail in Japanese published patent application No. 51-34734, the transparent resin film 50 containing fine articles of a matting agent is formed by applying and drying a solution of a resin such as polyolefine resin, polyacrylic acid resin, polyvinylch oride resin etc. containing 0.07–6% by weight of silica, the article size of which is 0.007–0.016 micron, said resin being dissolved in an organic solvent comprised of one or two out of alcohols, ketones and chloronized hydrocarbons.

Figure 4:
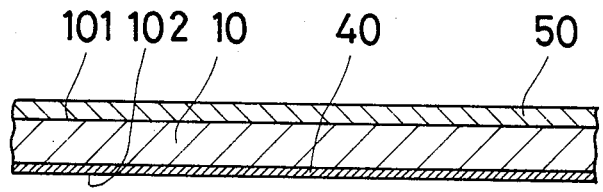
FIG. 4 is an enlarged fragmentary sectional view of a composite film protected from being reproduced according to the fourth aspect of the invention.

The composite film protected from being reproduced according to the fourth aspect of the invention, as shown in FIG. 4, comprises an orange, brown or red colored transparent film 10, a transparent resin film 50 containing fine articles of a matting agent, said resin film being applied to the surface 101 of the transparent film 10 and a metallic foil 40 capable of being seen through formed by vacuum deposition on the back 102 of the transparent film 10.

How to use the composite films according to the invention will be explained hereinafter.

The composite film for protecting documents from being reproduced according to the first aspect of the invention is affixed to the surface of a document (not shown) on which information has been recorded using the adhesive layer 20, after the releasing paper 30 is removed from the surface of the adhesive layer 20 if the releasing paper 30 has been affixed to the surface of the adhesive layer 20. The information on the document is visible through the transparent film 10 and the adhesive layer 20. Also, the composite film for protecting documents from being reproduced according to the second aspect of the invention is affixed to the surface of document using the adhesive layer 20, after the releasing paper 30 is removed from the surface of the adhesive layer 20 if the releasing paper 30 has been affixed to the surface of the adhesive layer 20. The information on the document is visible through the transparent film 10, the metallic foil 40 and the adhesive layer 20. However, the information on the documents to which the composite film for protecting documents from being reproduced according to the invention is affixed can't be reproduced by means of electronic duplicating machines or cameras because reproductions become black and are not readable.

On the composite film protected from being reproduced according to the third or fourth aspect of the invention information can easily be recorded by handwriting, printing and so on, and recorded information is clearly visible. However, the information can't be reproduced by means of electronic duplicating machines or cameras because reproductions become black and are not visible.

What is claimed is:

1. A composite film for protecting documents from being reproduced, said composite film being transparent and adapted to be affixed to the surface of a document on which information has been recorded, whereby the information can be read, but cannot be reproduced, comprising an orange, brown or red colored transparent film, a metallic foil capable of being seen through, said metallic foil being formed by vacuum deposition on the back of the transparent film, and a transparent adhesive layer applied to the surface of said metallic foil.

2. A composite film for protecting documents from being reproduced as claimed in claim 1, wherein a releasing paper is affixed removably to the surface of the adhesive layer.

* * * * *